US012756202B2

(12) United States Patent
Wu et al.

(10) Patent No.: US 12,756,202 B2
(45) Date of Patent: Oct. 6, 2026

(54) MULTI-TERMINAL FLEXIBLE DIRECT-CURRENT ADAPTIVE GRID-FORMING CONTROL SYSTEM, METHOD, DEVICE, AND MEDIUM

(71) Applicant: TSINGHUA UNIVERSITY, Beijing (CN)

(72) Inventors: Wenchuan Wu, Beijing (CN); Zizhen Guo, Beijing (CN); Haotian Liu, Beijing (CN); Hongbin Sun, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 19/319,769

(22) Filed: Sep. 5, 2025

(65) Prior Publication Data

US 2026/0142471 A1 May 21, 2026

(30) Foreign Application Priority Data

Nov. 19, 2024 (CN) ........................ 202411658131.9

(51) Int. Cl.
*H02J 3/40* (2026.01)
*H02J 1/102* (2026.01)
*H02J 3/0014* (2026.01)

(52) U.S. Cl.
CPC ................ *H02J 3/40* (2013.01); *H02J 1/102* (2013.01); *H02J 3/00142* (2026.01)

(58) Field of Classification Search
CPC ........... H02J 3/40; H02J 3/00142; H02J 1/102
See application file for complete search history.

(56) References Cited

U.S. PATENT DOCUMENTS 10,454,277 B2 * 10/2019 Koeppe ..................... H02J 1/08
2013/0197704 A1 * 8/2013 Pan ........................... H02J 3/36
363/35

* cited by examiner

*Primary Examiner* — Carlos Amaya

(57) ABSTRACT

Provided are multi-terminal flexible direct-current adaptive grid-forming control system and method, a device, and a medium. Power set values of a first adaptive grid-forming converter and a second adaptive grid-forming converter are set according to loss of a high-voltage direct-current line. An adaptive grid-forming control model is constructed, and an alternating-current voltage instruction is determined based on the adaptive grid-forming control model. A current inner loop constraint control strategy is established based on virtual admittance and current clamping. A current inner loop control instruction is determined according to the current inner loop constraint control strategy. An operation of the multi-terminal flexible direct-current adaptive grid-forming control system is controlled based on the power set values, the alternating-current voltage instruction, and the current inner loop control instruction.

10 Claims, 4 Drawing Sheets

MULTI-TERMINAL FLEXIBLE DIRECT-CURRENT ADAPTIVE GRID-FORMING CONTROL SYSTEM, METHOD, DEVICE, AND MEDIUM

This application claims priority to Chinese Patent Applications No. 202411658131.9 filed on Nov. 19, 2024, the entire contents of which are incorporated herein by reference.

FIELD

The present disclosure belongs to the technical field of flexible direct-current power transmission, and particularly relates to multi-terminal flexible direct-current adaptive grid-forming control system and method, a device, and a medium.

BACKGROUND

Flexible direct-current power transmission realizes fast and flexible adjustment of transmission power and a terminal voltage based on a high-power voltage source converter, and supports multi-site access and large-scale remote transmission of new energy sources such as wind power and photovoltaics. The flexible direct-current power transmission has great potential in promoting common coupling and consumption of new energy, and has gradually developed from a point-to-point topological mode to a multi-terminal interconnection mode. In an existing flexible direct-current new energy transmission scheme, a direct-current voltage is usually stabilized through power control of a receiving-terminal converter, and a transmitting-terminal converter establishes a stable alternating-current voltage and frequency for new energy access. In this mode, transmission power of new energy is completely decoupled from an operation state of a receiving-terminal alternating-current grid. With an increase in a usage rate of new energy, new energy needs to have an active frequency/voltage support capability to maintain a stable operation of an electrical power system.

A grid-forming control technology is a voltage-source control strategy. A flexible direct current using the grid-forming technology may independently respond to a disturbance in the receiving-terminal grid and enhance an active support capability for the grid. In existing grid-forming control, frequency-domain control, such as a virtual synchronous machine and droop control, has a slow response speed and inherits factors that are unfavorable to synchronization stability, such as power angle oscillation of a traditional synchronous machine. Compared with an electrical characteristic of the traditional synchronous machine, a virtual oscillator control strategy has a good grid-forming characteristic of approximately global asymptotic synchronization stability. However, an existing virtual oscillator control method only considers a two-state oscillation algorithm with fixed frequency and voltage amplitude, and does not consider the stability of the direct-current voltage. In actual operation, both a load disturbance and fluctuation in new energy output may cause direct-current energy instability. On the other hand, the transmitting-terminal converter faces problems of wide-frequency oscillation and a transient overvoltage caused by multi-terminal integration of high-proportion new energy when there is a lack of conventional synchronous power sources. The main problem lies in the failure to activate an active synchronization capability of new energy.

SUMMARY

In view of the above problems, the present disclosure provides multi-terminal flexible direct-current adaptive grid-forming control system and method, a device, and a medium. Through multi-machine peer-to-peer grid-forming control of a multi-terminal flexible direct-current converter, a multi-terminal flexible direct current is allowed to realize multi-terminal active synchronization and flexible access of new energy, activate an active support capability of the flexible direct current for a receiving-terminal grid and a transmitting-terminal grid, and achieve adaptive stable transmission of new energy without a conventional power source.

An aspect of embodiments of the present disclosure provides a multi-terminal flexible direct-current adaptive grid-forming control system. The multi-terminal flexible direct-current adaptive grid-forming control system includes: a plurality of energy systems, a plurality of inverters, a first adaptive grid-forming converter, a transmitting-terminal point of common coupling, a second adaptive grid-forming converter, a plurality of receiving-terminal points of common coupling, and a high-voltage direct-current line. The plurality of energy systems are connected to the plurality of inverters, the plurality of inverters are connected to the transmitting-terminal point of common coupling; the transmitting-terminal point of common coupling establishes a connection with the high-voltage direct-current line through the first adaptive grid-forming converter; the high-voltage direct-current line is connected to the plurality of receiving-terminal points of common coupling through the second adaptive grid-forming converter. A receiving-terminal grid is connected to the plurality of receiving-terminal points of common coupling; and each of the first adaptive grid-forming converter and the second adaptive grid-forming converter includes: an oscillation phase module, an oscillation amplitude module, an oscillation frequency module, and an oscillator module.

Preferably, a remote energy system is connected to a nearby converter and is connected to the high-voltage direct-current line through a third adaptive grid-forming converter; and a remote load center is connected to a nearby converter and is connected to the high-voltage direct-current line through a fourth adaptive grid-forming converter.

Based on the same inventive concept, another aspect of the embodiments of the present disclosure further provides a multi-terminal flexible direct-current adaptive grid-forming control method, applied in the multi-terminal flexible direct-current adaptive grid-forming control system. The multi-terminal flexible direct-current adaptive grid-forming control method includes: setting power set values of the first adaptive grid-forming converter and the second adaptive grid-forming converter according to loss of the high-voltage direct-current line; constructing an adaptive grid-forming control model and determining an alternating-current voltage instruction based on the adaptive grid-forming control model; establishing a current inner loop constraint control strategy based on virtual admittance and current clamping, determining a current inner loop control instruction according to the current inner loop constraint control strategy; and controlling an operation of the multi-terminal flexible direct-current adaptive grid-forming control system based on the power set values, the alternating-current voltage instruction, and the current inner loop control instruction.

Preferably, said constructing the adaptive grid-forming control model and determining the alternating-current voltage instruction based on the adaptive grid-forming control model includes: obtaining a direct-current voltage signal and an alternating-current voltage signal; determining an alternating-current line impedance parameter angle based on alternating-current line resistance, alternating-current line inductance, and an alternating-current rated frequency; and establishing a two-dimensional rotation matrix through an alternating-current voltage phase angle in an oscillator.

Preferably, the method further includes: determining a set value of a direct-current voltage amplitude and a set value of an alternating-current voltage amplitude according to the direct-current voltage signal and the alternating-current voltage signal; and determining an active power set value and a reactive power set value according to the direct-current voltage signal and the alternating-current voltage signal.

Preferably, the method further includes: determining a power set value matrix according to the two-dimensional rotation matrix, the set value of the alternating-current voltage amplitude, the active power set value, and the reactive power set value; and constructing the adaptive grid-forming control model according to the two-dimensional rotation matrix, the alternating-current line impedance parameter angle, the power set value matrix, an active synchronization control parameter, the alternating-current voltage amplitude, and the alternating-current rated frequency, and determining the alternating-current voltage instruction based on the adaptive grid-forming control model.

Preferably, the establishing the current inner loop constraint control strategy based on the virtual admittance and the current clamping includes: determining an oscillator phase angle based on a quadrature-axis component and a direct-axis component of the alternating-current voltage instruction; determining a current inner loop control instruction prior to amplitude limiting according to the alternating-current voltage instruction, the virtual admittance, and virtual resistance; and performing the amplitude limiting according to the current inner loop control instruction prior to the amplitude limiting and a current clamping threshold, and determining a current inner loop control instruction subsequent to the amplitude limiting.

Preferably, the establishing the current inner loop constraint control strategy based on the virtual admittance and the current clamping further includes: obtaining a quadrature-axis current control instruction and a direct-axis current control instruction through coordinate transformation, and obtaining a pulse width modulation signal by performing the coordinate transformation through a phase angle.

Based on the same inventive concept, another aspect of the embodiments of the present disclosure further provides an electronic device. The electronic device includes: a processor; a communication interface; a memory storing a computer program; and a communication bus. The processor, the communication interface, and the memory complete mutual communication through the communication bus, and the processor, when executing the program stored in the memory, implements the multi-terminal flexible direct-current adaptive grid-forming control method.

Based on the same inventive concept, another aspect of the embodiments of the present disclosure further provides a computer-readable storage medium, storing a computer program. The computer program, when executed by a processor, implements the multi-terminal flexible direct-current adaptive grid-forming control method.

The above one or at least one technical solution in the embodiments of the present disclosure at least has the following technical effects. The present disclosure sets the power set values of the first adaptive grid-forming converter and the second adaptive grid-forming converter according to the loss of the high-voltage direct-current line; constructs the adaptive grid-forming control model, and determines the alternating-current voltage instruction based on the adaptive grid-forming control model; establishes the current inner loop constraint control strategy based on the virtual admittance and the current clamping; determines the current inner loop control instruction according to the current inner loop constraint control strategy; and constrains the operation of the multi-terminal flexible direct-current adaptive grid-forming control system based on the power set values, the alternating-current voltage instruction, and the current inner loop control instruction. Through the multi-machine peer-to-peer grid-forming control of the multi-terminal flexible direct-current converter, the multi-terminal flexible direct current is allowed to realize the multi-terminal active synchronization and flexible access of new energy, activate the active support capability of the flexible direct current for the receiving-terminal grid and the transmitting-terminal grid, and achieve adaptive active-synchronization stable transmission of new energy without the conventional power source.

Other features and advantages of the present disclosure will be set forth in the following specification, and will become apparent in part from the specification, or will be learned by implementing the present disclosure. Objectives and other advantages of the present disclosure may be realized and obtained through the structures specified in the description and the accompanying drawings.

BRIEF DESCRIPTION OF THE DRAWINGS

In order to clearly explain technical solutions according to the embodiments of the present disclosure or in the related art, a brief introduction to drawings used in the description of the embodiments or the related art will be given below. Obviously, the drawings described below are some embodiments of the present disclosure. Based on these drawings, other drawings can be obtained by those skilled in the art without creative effort.

DETAILED DESCRIPTION

Figure 1:
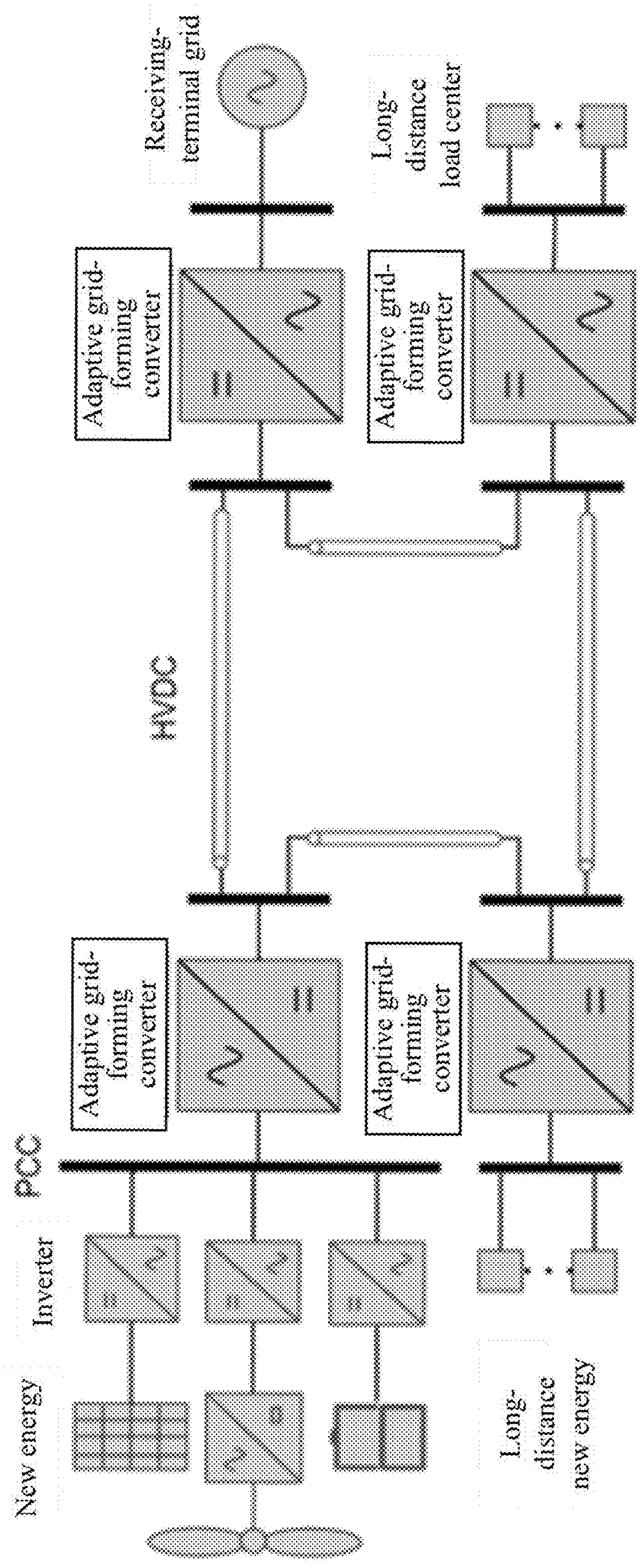
FIG. 1 shows a schematic diagram of a multi-terminal flexible direct-current system adapted to power transmission without a conventional power source.

In order to make the objects, technical solutions, and advantages of embodiments of the present disclosure more apparent, technical solutions according to the embodiments of the present disclosure will be clearly and completely described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

It should be noted that the terms such as “first” and “second” in the present disclosure are used only to distinguish between similar objects, rather than to describe a particular order or sequence. It should be understood that the data as used can be interchanged where appropriate, to facilitate the embodiments of the present disclosure described herein. In the present disclosure, the orientation or the position indicated by terms such as “over”, “below”, “left”, “right”, “front”, “rear”, “top”, “bottom”, “inner”, “outer”, “middle”, “vertical”, “horizontal”, “lateral”, and “longitudinal” should be construed to refer to the orientation and the position as shown in the drawings.

An aspect of the embodiments of the present disclosure provides a multi-terminal flexible direct-current adaptive grid-forming control system. Referring to FIG. 1, the multi-terminal flexible direct-current adaptive grid-forming control system includes: a plurality of energy systems, a plurality of inverters, a first adaptive grid-forming converter, a transmitting-terminal point of common coupling, a second adaptive grid-forming converter, a plurality of receiving-terminal points of common coupling, and a high-voltage direct-current line. The plurality of energy systems are connected to the plurality of inverters, the plurality of inverters are connected to the transmitting-terminal point of common coupling; the transmitting-terminal point of common coupling establishes a connection with the high-voltage direct-current line through the first adaptive grid-forming converter; the high-voltage direct-current line is connected to the plurality of receiving-terminal points of common coupling through the second adaptive grid-forming converter, in which a receiving-terminal grid is connected to the plurality of receiving-terminal points of common coupling; and each of the first adaptive grid-forming converter and the second adaptive grid-forming converter includes: an oscillation phase module, an oscillation amplitude module, an oscillation frequency module, and an oscillator module.

Preferably, a remote energy system is connected to a nearby converter and is connected to the high-voltage direct-current line through a third adaptive grid-forming converter; and a remote load center is connected to a nearby converter and is connected to the high-voltage direct-current line through a fourth adaptive grid-forming converter.

It should be noted that the grid-forming control system provided in the present disclosure is a multi-terminal flexible direct-current system adapted to power transmission without a conventional power source. The technical problems to be solved are that an existing virtual oscillator control method does not consider stability of a direct-current voltage, and in actual operation, both a load disturbance and fluctuation in new energy output may cause direct-current energy instability. On the other hand, a transmitting-terminal converter faces problems of wide-frequency oscillation and a transient overvoltage caused by multi-terminal integration of high-proportion new energy when there is a lack of conventional synchronous power sources. The plurality of energy systems referred to in the present disclosure may be one or more systems for new energy generation, such as those for photovoltaic power generation, wind power generation, thermal power generation, and battery power supply, and each energy system is connected to the transmitting-terminal point of common coupling through a corresponding inverter.

The first adaptive grid-forming converter in the present disclosure is mainly used for connecting the plurality of energy systems to a transmitting terminal. The second adaptive grid-forming converter is mainly used for connecting the plurality of energy systems to the receiving-terminal grid or an electricity load terminal.

Specifically, it is to be noted that the remote energy system referred to in the present disclosure refers to an energy generation system set at a distance of more than 300 kilometers. The remote energy system is connected to the high-voltage direct-current line through a nearby third adaptive grid-forming converter. The remote load center is a load center more than 300 kilometers away from the high-voltage direct-current line. Similarly, the remote load center is also connected to the high-voltage direct-current line through a fourth adaptive grid-forming converter nearby the remote load center.

The first adaptive grid-forming converter, the second adaptive grid-forming converter, the third adaptive grid-forming converter, and the fourth adaptive grid-forming converter in the present disclosure are same converters, which are applicable to a two-terminal flexible direct-current system to a multi-terminal flexible direct-current system. By taking a four-terminal flexible direct current as an example, referring to FIG. 1, new energy is connected to a point of common coupling (PCC) through an inverter, and then connected to a high-voltage direct-current (HVDC) line through the converter. New energy at a relatively long distance may be connected to the HVDC line through a nearby established converter to form the multi-terminal flexible direct-current system.

Figure 2:
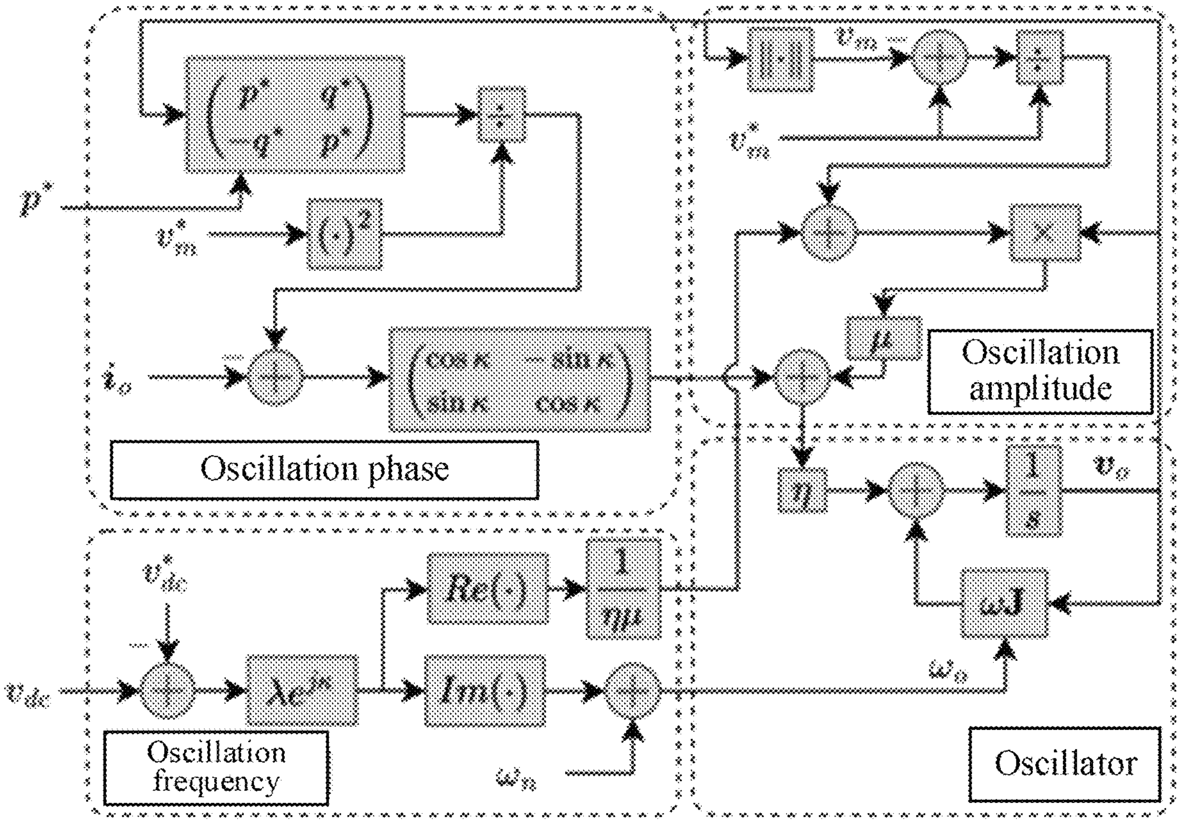
FIG. 2 shows a block diagram of multi-terminal flexible direct-current adaptive grid-forming control adapted to power transmission without a conventional power source.

Similarly, in response to the occurrence of more than one remote urban load center, corresponding nearby converters may be connected to the multi-terminal flexible direct-current system. Each converter in the multi-terminal flexible direct-current system adopts a unified adaptive grid-forming control method, which is applied in the adaptive grid-forming converter of the present disclosure. Referring to FIG. 2, the adaptive grid-forming converter is mainly composed of four modules, i.e., the oscillation phase module, the oscillation amplitude module, the oscillation frequency module, and the oscillator module.

Figure 3:
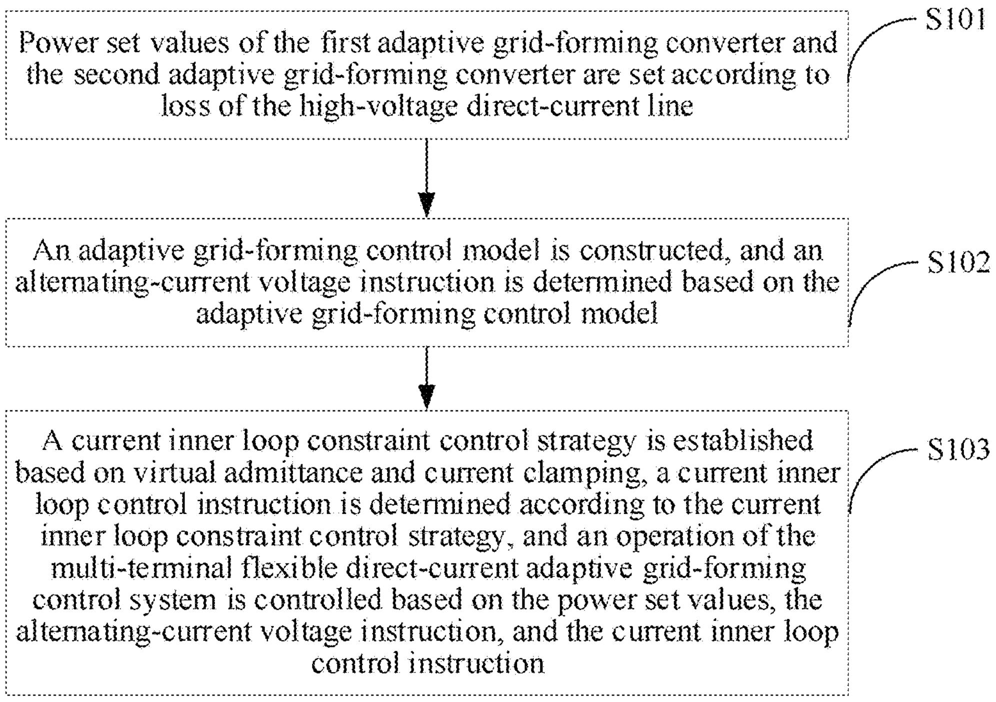
FIG. 3 shows a flowchart of a multi-terminal flexible direct-current adaptive grid-forming control method.

Based on the same inventive concept, another aspect of the embodiments of the present disclosure further provides a multi-terminal flexible direct-current adaptive grid-forming control method, which is applied in the multi-terminal flexible direct-current adaptive grid-forming control system. Referring to FIG. 3, the multi-terminal flexible direct-current adaptive grid-forming control method includes operations at blocks S101 to S103.

At block S101, power set values of the first adaptive grid-forming converter and the second adaptive grid-forming converter are set according to loss of the high-voltage direct-current line.

At block S102, an adaptive grid-forming control model is constructed, and an alternating-current voltage instruction is determined based on the adaptive grid-forming control model.

At block S103, a current inner loop constraint control strategy is established based on virtual admittance and current clamping, a current inner loop control instruction is determined according to the current inner loop constraint control strategy, and an operation of the multi-terminal flexible direct-current adaptive grid-forming control system is controlled based on the power set values, the alternating-current voltage instruction, and the current inner loop control instruction.

Specifically, in block S102, the constructing the adaptive grid-forming control model and determining the alternating-current voltage instruction based on the adaptive grid-forming control model includes: obtaining a direct-current voltage signal and an alternating-current voltage signal; determining an alternating-current line impedance parameter angle based on alternating-current line resistance, alternating-current line inductance, and an alternating-current rated frequency; and establishing a two-dimensional rotation matrix through an alternating-current voltage phase angle in an oscillator.

The method further includes: determining a set value of a direct-current voltage amplitude and a set value of an alternating-current voltage amplitude according to the direct-current voltage signal and the alternating-current voltage signal; and determining an active power set value and a reactive power set value according to the direct-current voltage signal and the alternating-current voltage signal.

Specifically, referring to FIG. 2, a power set value of each converter in the multi-terminal flexible direct-current system is set as p*, so that a power set value of a multi-terminal flexible direct-current converter satisfies the following equation:

$$\sum_{i=1}^{N} p_i^* + P_{loss}^{dc} = 0 \tag{1}$$

where $$p_i^*$$

is a power set value of an $i_{th}$ converter, N is a total number of converters, and $$P_{loss}^{dc}$$

is loss of the direct-current line.

The method further includes: determining a power set value matrix according to the two-dimensional rotation matrix, the set value of the alternating-current voltage amplitude, the active power set value, and the reactive power set value.

Further, the method further includes: constructing the adaptive grid-forming control model according to the two-dimensional rotation matrix, the alternating-current line impedance parameter angle, the power set value matrix, an active synchronization control parameter, the alternating-current voltage amplitude, and the alternating-current rated frequency, and determining the alternating-current voltage instruction based on the adaptive grid-forming control model.

Specifically, the adaptive grid-forming control model is established, and is expressed by the following equation:

$$\frac{d}{dt}\upsilon_o = \omega_o J \upsilon_o + \eta(K\upsilon_o - R(\kappa)i_o + \mu\phi(\upsilon_m, \upsilon_{dc})\upsilon_o), \tag{2}$$

$$K = \frac{1}{\upsilon_m^{*2}} R(\kappa)\begin{bmatrix} p^* & q^* \\ -q^* & p^* \end{bmatrix}, \tag{3}$$

$$\omega_o = \omega_n + \lambda \cdot \sin(\kappa)(\upsilon_{dc} - \upsilon_{dc}^*), \tag{4}$$

$$\phi(\upsilon_m, \upsilon_{dc}) = \frac{\upsilon_m^* - \upsilon_m}{\upsilon_m^*} + \frac{\lambda}{\eta\mu}\cos\kappa(\upsilon_{dc} - \upsilon_{dc}^*) \tag{5}$$

where $v_{dc}$ is a direct-current side voltage, which is a voltage at a direct-current terminal of the HVDC line for the flexible direct-current converter; a vector $v_o=[v_\alpha\ v_\beta]^T$ is the alternating-current voltage instruction, and $v_\alpha$ and $v_\beta$ are a-axis component and β-axis component of the alternating-current voltage instruction; a vector $i_o=[i_\alpha\ i_\beta]^T$ is an alternating current, and $i_\alpha$ and $i_\beta$ are α-axis component and β-axis component of the alternating current. The operator ||•|| represents the Euclidean norm of the vector, and K is the power set value matrix.

η is the active synchronization control parameter; μ is an amplitude control parameter; λ is a direct-current voltage control parameter; $v_m=\|v_o\|$ is the alternating-current voltage amplitude;

$$p^*, q^*, \upsilon_{dc}^*, \upsilon_m^*$$

are the active power set value, the reactive power set value, the set value of the direct-current voltage amplitude, and the set value of the alternating-current voltage amplitude, respectively; $\omega_n$ is the alternating-current rated frequency, and K is the alternating-current line impedance parameter angle, which is defined according to the alternating-current line resistance $R_g$ and alternating-current line inductance $L_g$ as:

$$\kappa = \tan^{-1}(\omega_n L_g / R_g), . \tag{6}$$

A matrix R is a two-dimensional rotation matrix, and is defined as:

$$R(\theta) = \begin{bmatrix} \cos\theta & -\sin\theta \\ \sin\theta & \cos\theta \end{bmatrix}. \tag{7}$$

In particular, it is defined that J=R(π/2).

By expanding an oscillator state, control flexibility, for amplitude and frequency of an oscillator, of a grid-forming control algorithm may be fully utilized, thereby realizing stable control at the direct-current voltage, and preventing a risk where the occurrence of direct-current voltage instability due to an insufficient output capability at a direct-current side may cause collapse of the multi-terminal flexible direct-current system or transient instability and off-grid of new energy. Based on a control strategy design of the oscillator, a multi-machine alternating-current characteristic under each PCC point has good global asymptotic synchronization stability. It should be noted that the core of this method is to enable the multi-terminal flexible direct-current system to have flexible access and stable transmission of new energy without the conventional power source through a unified adaptive grid-forming design. The advantage of multi-machine global synchronization stability may avoid HVDC oscillation blocking or new energy oscillation off-grid caused by the interaction of alternating-current and direct-current hybrid systems under a large disturbance.

In some embodiments, the establishing the current inner loop constraint control strategy based on the virtual admittance and the current clamping includes: determining an oscillator phase angle based on a quadrature-axis component and a direct-axis component of the alternating-current voltage instruction; determining a current inner loop control instruction prior to amplitude limiting according to the alternating-current voltage instruction, the virtual admittance, and virtual resistance; and performing the amplitude limiting according to the current inner loop control instruction prior to the amplitude limiting and a current clamping threshold, and determining a current inner loop control instruction subsequent to the amplitude limiting.

Further, the establishing the current inner loop constraint control strategy based on the virtual admittance and the current clamping further includes: obtaining a quadrature-axis current control instruction and a direct-axis current control instruction through coordinate transformation, and obtaining a pulse width modulation signal by performing the coordinate transformation through a phase angle.

Figure 4:
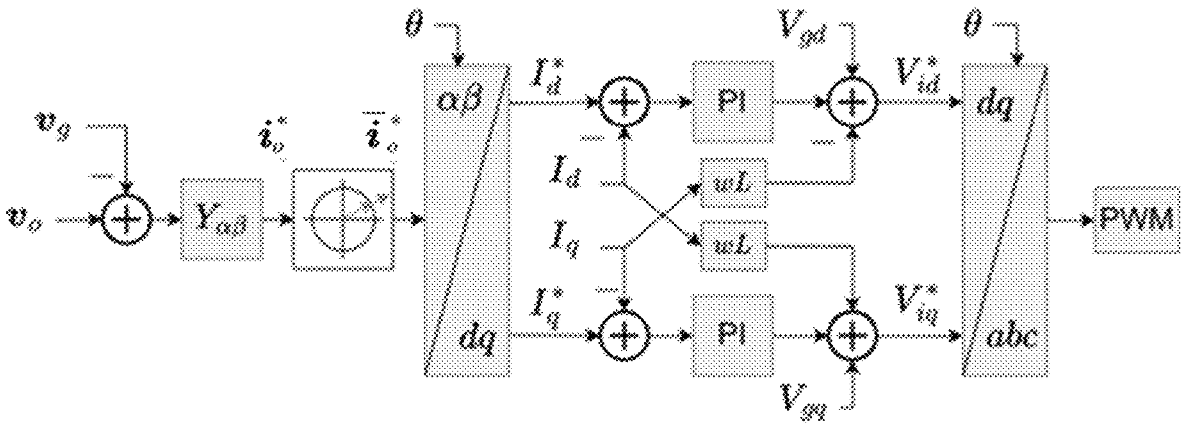
FIG. 4 shows a block diagram of multi-terminal flexible direct-current adaptive grid-forming current inner loop control.

Specifically, referring to FIG. 4, in order to suppress a transient overcurrent that may occur during grid-forming control, current inner loop control is designed based on the virtual admittance and the current clamping.

The oscillator phase angle may be calculated by the following equation:

$$\theta = \tan^{-1}(v_\beta / v_\alpha), \tag{8}$$

where a vector $v_g=[V_{g\alpha}\ V_{g\beta}]^T$ is grid-side voltage measurement, $V_{g\alpha}$ and $V_{g\beta}$ are α-axis component and β-axis component of the grid-side voltage measurement, and $Y_{\alpha\beta}$ is the virtual admittance, the following equation is met:

$$i_o^* = \frac{1}{sL_v + R_v} \cdot (v_o - v_g) \tag{9}$$

where $L_v$ and $R_v$ are virtual inductance and virtual resistance, respectively, and may be used for adjusting damping and a small disturbance stability margin of grid-forming control to high-frequency component, respectively; and $$i_o^*$$

is the current inner loop control instruction prior to the amplitude limiting, and the amplitude limiting is performed as follows:

$$\bar{i}_o^* = \begin{cases} i_o^* & \|i_o^*\| \leq I_{max} \\ \frac{I_{max}}{\|i_o^*\|} i_o^* & \|i_o^*\| > I_{max} \end{cases} \tag{10}$$

where $I_{max}$ is the current clamping threshold, and $$\bar{i}_o^*$$

is the current inner loop control instruction after the amplitude limiting. A dq-axis current control instruction is obtained through the coordinate transformation, where $$I_d^* \text{ and } I_q^*$$

are d-axis component and q-axis component of the current inner loop instruction; $I_d$ and $I_q$ are d-axis component and q-axis component of an actual alternating current; ωL is a feedforward control gain designed according to filter inductance; and $$V_{id}^* \text{ and } V_{iq}^*$$

are d-axis component and q-axis component of the alternating-current voltage. A pulse width modulation (PWM) signal is obtained through the coordinate transformation based on the phase angle θ. The coordinate transformation is expressed by the following equations:

$$\begin{bmatrix} x_\alpha \\ x_\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} x_a \\ x_b \\ x_c \end{bmatrix} \tag{11}$$

$$\begin{bmatrix} x_d \\ x_q \end{bmatrix} = \begin{bmatrix} \cos(\theta) & \sin(\theta) \\ -\sin(\theta) & \cos(\theta) \end{bmatrix} \begin{bmatrix} x_\alpha \\ x_\beta \end{bmatrix} \tag{12}$$

x refers to a general variable, the subscript αβ indicates that it is in a stationary two-dimensional coordinate system, the subscript abc indicates that it is in a stationary three-dimensional coordinate system, and the subscript dq indicates that it is in a rotating two-dimensional coordinate system.

Figure 5:
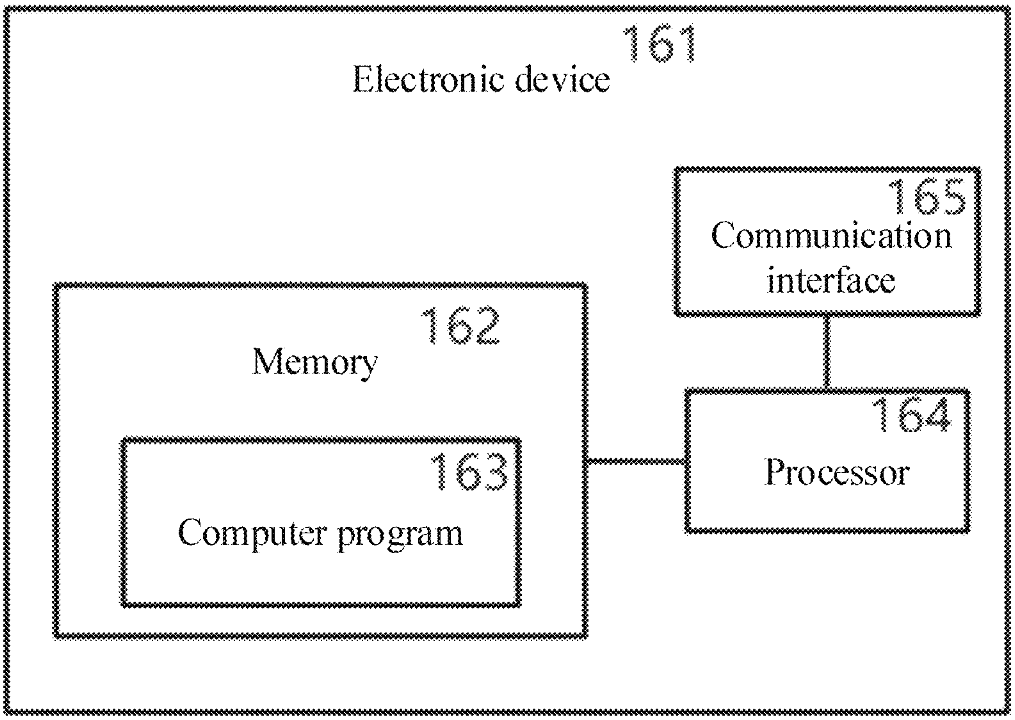
FIG. 5 shows a schematic diagram of an electronic device.

Based on the same inventive concept, another aspect of the embodiments of the present disclosure further provides an electronic device 161. Referring to FIG. 5, the electronic device 161 includes a processor 164, a communication interface 165, a memory 162, and a communication bus. The processor 164, the communication interface 165, and the memory 162 complete mutual communication through the communication bus. The memory 162 stores a computer program 163. The processor 164, when executing the program stored in the memory 162, implements the multi-terminal flexible direct-current adaptive grid-forming control method.

The aforementioned communication bus may be a peripheral component interconnect (PCI) bus, an extended industry standard architecture (EISA) bus, or the like. The communication bus may be an address bus, a data bus, a control bus, and the like.

The communication interface 165 is used for communication between the electronic device 161 and other devices.

The memory 162 may include a random access memory (RAM) 162 or a non-volatile memory 162, such as at least one disk memory 162. Optionally, the memory 162 may also be at least one storage device located away from the aforementioned processor 164.

The aforementioned processor 164 may be a general-purpose processor 164, including a central processing unit (CPU) 164, a network processor (NP) 164, and the like. The aforementioned processor 164 may also be a digital signal processing (DSP) 164, an application specific integrated circuit (ASIC), a field-programmable gate array (FPGA), or other programmable logic devices, discrete gates or transistor logic devices, or discrete hardware components.

Based on the same inventive concept, another aspect of the embodiments of the present disclosure further provides a computer-readable storage medium, storing a computer program 163. The computer program 163, when executed by a processor 164, implements the multi-terminal flexible direct-current adaptive grid-forming control method.

The computer-readable storage medium may be included in the device/apparatus described in the foregoing embodiments or may exist independently without being assembled into the device/apparatus. The aforementioned computer-readable storage medium carries one or more programs. The one or more programs, when executed, implement the multi-terminal flexible direct-current adaptive grid-forming control method according to the embodiments of the present disclosure.

The above embodiments are used only to illustrate, rather than to limit, the technical solutions of the present disclosure. Although the present disclosure has been described in detail with reference to the foregoing embodiments, it is conceivable for those skilled in the art that modifications can be made to the technical solutions described in the foregoing embodiments, or equivalent replacements can be made to some of the technical features in the technical solutions described in the foregoing embodiments. These modifications or equivalent replacements do not depart the essence of corresponding technical solutions from the spirit and scope of the technical solutions of the embodiments of the present disclosure.

What is claimed is:

1. A multi-terminal flexible direct-current adaptive grid-forming control system, comprising a plurality of energy systems, a plurality of inverters, a first adaptive grid-forming converter, a transmitting-terminal point of common coupling, a second adaptive grid-forming converter, a plurality of receiving-terminal points of common coupling, and a high-voltage direct-current line, wherein the plurality of energy systems are connected to the plurality of inverters, the plurality of inverters are connected to the transmitting-terminal point of common coupling;

the transmitting-terminal point of common coupling establishes a connection with the high-voltage direct-current line through the first adaptive grid-forming converter;

the high-voltage direct-current line is connected to the plurality of receiving-terminal points of common coupling through the second adaptive grid-forming converter, wherein a receiving-terminal grid is connected to the plurality of receiving-terminal points of common coupling; and each of the first adaptive grid-forming converter and the second adaptive grid-forming converter comprises: an oscillation phase module, an oscillation amplitude module, an oscillation frequency module, and an oscillator module.

2. The multi-terminal flexible direct-current adaptive grid-forming control system according to claim 1, wherein:

a remote energy system is connected to a nearby converter and is connected to the high-voltage direct-current line through a third adaptive grid-forming converter; and a remote load center is connected to a nearby converter and is connected to the high-voltage direct-current line through a fourth adaptive grid-forming converter.

3. A multi-terminal flexible direct-current adaptive grid-forming control method, applied in a multi-terminal flexible direct-current adaptive grid-forming control system, wherein the system comprises a plurality of energy systems, a plurality of inverters, a first adaptive grid-forming converter, a transmitting-terminal point of common coupling, a second adaptive grid-forming converter, a plurality of receiving-terminal points of common coupling, and a high-voltage direct-current line, wherein the plurality of energy systems are connected to the plurality of inverters, the plurality of inverters are connected to the transmitting-terminal point of common coupling;

the transmitting-terminal point of common coupling establishes a connection with the high-voltage direct-current line through the first adaptive grid-forming converter;

the high-voltage direct-current line is connected to the plurality of receiving-terminal points of common coupling through the second adaptive grid-forming converter, wherein a receiving-terminal grid is connected to the plurality of receiving-terminal points of common coupling; and each of the first adaptive grid-forming converter and the second adaptive grid-forming converter comprises: an oscillation phase module, an oscillation amplitude module, an oscillation frequency module, and an oscillator module, the method comprises:

setting power set values of the first adaptive grid-forming converter and the second adaptive grid-forming converter according to loss of the high-voltage direct-current line;

constructing an adaptive grid-forming control model and determining an alternating-current voltage instruction based on the adaptive grid-forming control model;

establishing a current inner loop constraint control strategy based on virtual admittance and current clamping, determining a current inner loop control instruction according to the current inner loop constraint control strategy; and controlling an operation of the multi-terminal flexible direct-current adaptive grid-forming control system based on the power set values, the alternating-current voltage instruction, and the current inner loop control instruction.

4. The method according to claim 3, wherein said constructing the adaptive grid-forming control model and determining the alternating-current voltage instruction based on the adaptive grid-forming control model comprises:

obtaining a direct-current voltage signal and an alternating-current voltage signal;

determining an alternating-current line impedance parameter angle based on alternating-current line resistance, alternating-current line inductance, and an alternating-current rated frequency; and establishing a two-dimensional rotation matrix through an alternating-current voltage phase angle in an oscillator.

5. The method according to claim 4, further comprising:

determining a set value of a direct-current voltage amplitude and a set value of an alternating-current voltage amplitude according to the direct-current voltage signal and the alternating-current voltage signal; and determining an active power set value and a reactive power set value according to the direct-current voltage signal and the alternating-current voltage signal.

6. The method according to claim 5, further comprising:

determining a power set value matrix according to the two-dimensional rotation matrix, the set value of the alternating-current voltage amplitude, the active power set value, and the reactive power set value; and constructing the adaptive grid-forming control model according to the two-dimensional rotation matrix, the alternating-current line impedance parameter angle, the power set value matrix, an active synchronization control parameter, the alternating-current voltage amplitude, and the alternating-current rated frequency, and determining the alternating-current voltage instruction based on the adaptive grid-forming control model.

7. The method according to claim 3, wherein said establishing the current inner loop constraint control strategy based on the virtual admittance and the current clamping comprises:

determining an oscillator phase angle based on a quadrature-axis component and a direct-axis component of the alternating-current voltage instruction;

determining a current inner loop control instruction prior to amplitude limiting according to the alternating-current voltage instruction, the virtual admittance, and virtual resistance; and performing the amplitude limiting according to the current inner loop control instruction prior to the amplitude limiting and a current clamping threshold, and determining a current inner loop control instruction subsequent to the amplitude limiting.

8. The method according to claim 7, wherein said establishing the current inner loop constraint control strategy based on the virtual admittance and the current clamping further comprises:

obtaining a quadrature-axis current control instruction and a direct-axis current control instruction through coordinate transformation, and obtaining a pulse width modulation signal by performing the coordinate transformation through a phase angle.

9. An electronic device, comprising:

a processor;

a communication interface;

a memory storing a computer program; and a communication bus, wherein the processor, the communication interface, and the memory complete mutual communication through the communication bus, and wherein the processor, when executing the program stored in the memory, implements the multi-terminal flexible direct-current adaptive grid-forming control method according to claim 3.

10. A non-transitory computer-readable storage medium, storing a computer program, wherein the computer program, when executed by a processor, implements the multi-terminal flexible direct-current adaptive grid-forming control method according to claim 3.

* * * * *